United States Patent [19]
Briggs

[11] Patent Number: 5,735,021
[45] Date of Patent: Apr. 7, 1998

[54] SNAP STUD ASSEMBLY

[75] Inventor: Jeffrey M. Briggs, Mountaintop, Pa.

[73] Assignee: Allen-Stevens Corp., West Hazleton, Pa.

[21] Appl. No.: 802,550

[22] Filed: Feb. 18, 1997

[51] Int. Cl.[6] .................................................. E05D 15/00
[52] U.S. Cl. .................. 16/369; 16/386; 16/273; 16/2.1; 403/153; 411/60
[58] Field of Search ........................... 16/369, 383, 386, 16/368, 370, 371, 2.1, 2.2, 2.5, 273; 49/396, 246, 250, 251, 252, 266; 403/119, 153, 154, 155; 411/41, 60, 48, 45

[56] References Cited

U.S. PATENT DOCUMENTS

| Re. 32,846 | 1/1989 | Sandberg et al. | |
|---|---|---|---|
| 2,264,747 | 12/1941 | Fether | 16/386 |
| 3,053,046 | 9/1962 | Fleming, Jr. | 411/60 |
| 3,385,158 | 5/1968 | Morin | 411/45 |
| 3,499,183 | 3/1970 | Parsons | 16/273 |
| 3,939,529 | 2/1976 | Davis | 16/273 |
| 4,202,243 | 5/1980 | Leonhardt | 403/153 |
| 4,726,092 | 2/1988 | Tacheny et al. | 16/370 |
| 4,986,028 | 1/1991 | Schneider et al. | |
| 5,392,494 | 2/1995 | Wronski | |
| 5,491,930 | 2/1996 | La See | |

FOREIGN PATENT DOCUMENTS

| 282171 | 7/1948 | Switzerland . |
|---|---|---|

*Primary Examiner*—Chuck Mah
*Attorney, Agent, or Firm*—Hill & Simpson

[57] ABSTRACT

A snap stud assembly is provided for pivotally connecting two hardware members together. A stud is disposed within a tubular sleeve. A lower or bottom end of the stud is attached to a lower hardware member by pressing or deforming the bottom end of the stud member to provide an interference fit. The upper hardware member is mounted over a top end of the plastic sleeve which includes a top flange but which is resiliently compressible in the radially inward direction so that the top hardware member may be easily forced over the top end of the plastic sleeve. Once installed, the upper hardware member is disposed between a top flange and a bottom flange of the plastic sleeve which serves as a bushing about which the top member pivots as well as a washer between the top hardware member and bottom hardware member.

21 Claims, 1 Drawing Sheet

SNAP STUD ASSEMBLY

FIELD OF THE INVENTION

The present invention relates generally to systems for pivotally connecting two hardware members together. More specifically, the present invention relates to stud-type attachments for pivotally connecting the two hardware members together.

BACKGROUND OF THE INVENTION

Many products require two flat, rod-like members to be pivotally connected together. One such structure or product is a casement window which includes a window sash that is mounted to a window frame so that the window can pivot outward about one side of the window. The typical casement window includes two hinges, one disposed at the top of the window and one disposed at the bottom of the window, both hinges being adjacent to the pivoting side of the window. Casement window hinges typically include two rod-like members with through holes disposed at either end of the members. The ends of the hinge members may be pivotally or slidably attached to a track mounted on the window frame or they may be pivotally attached to the window sash, depending upon the hinge and window design. Often, the hinge members are pivotally connected together.

Casement window operators typically include one end that is connected to a crank mechanism mounted on the window frame and an opposing end that may be pivotally connected to the underside of the window sash.

The pivotal connection of the end of an operating member to a window sash, the pivotal connection of an end of a hinge member to a window sash or to a hinge track, the pivotal connection between two hinge members or, generally, the pivotal connection between two rod-like members has proven to be problematic for manufacturers. Specifically, the currently available means of pivotally connecting two hardware members together have functional limitations and are difficult to assemble using automated equipment.

One fastening device for pivotally attaching two hardware members together is a spring clip which includes a head with an outer periphery larger than the through hole of the hardware member and a plurality of outwardly biased fingers that may be flexed inward during the insertion of the fingers through the two through holes of the hardware members to be connected but which flex outwardly after insertion. Because the metal fingers of the spring clips are in constant engagement with the side walls of the through holes of the metal hardware members, friction between the fingers and the through holes and eventual wear of the fingers is a problem. This problem is further compounded by the lack of any lubricant disposed between the two pivoting hardware members and between the through holes of the hardware members and the fingers of the spring clip.

An advancement over spring clip attachments is presented by various snap stud designs. A typical snap stud includes a cylindrical member with a central flange that is disposed between the two pivoting hardware members. The flange acts as a bushing or a washer. A lower section of the stud extends through the lower hardware member and an upper section of the stud extends through the upper hardware member. To connect the lower and upper hardware members to the upper and lower sections of the stud, two basic mechanisms are employed. First, one of the sections of the stud may be pressed or deformed to form a rim which traps the hardware member between the central flange and the formed rim. A second mechanism may include the employment of a snap ring mounted in a groove in one section of the stud to trap the other hardware member between the snap ring and the central flange.

The primary problem with snap stud mechanisms is the number of manufacturing steps that are required. Specifically, after the stud is fabricated and the pivoting hardware members are mounted on either side of the central flange of the stud, two separate connections must be made: a first connection between the lower section of the stud and the lower hardware member and a second connection between the upper section of the stud and the upper hardware member. While the snap stud design is superior to a spring clip device in terms of wear and tear and smoothness of operation, the snap stud design is more time consuming and more expensive to manufacture than the spring clip design.

Accordingly, there is a need for an improved snap stud design which provides both a durable and low friction pivotal connection between two hardware members and which is also fast and easy to assemble.

SUMMARY OF THE INVENTION

The present invention addresses the aforenoted need by providing a snap stud assembly for pivotally connecting two hardware members that is faster and easier to install than previous snap stud assemblies and which further provides an improved pivotal connection over previous snap stud assemblies and spring clips. The snap stud of the present invention includes a stud with a lower section and an upper section. The lower section of the stud has a smaller outside diameter than the upper section of the stud. The assembly also includes a tubular plastic sleeve member with a top end and a bottom end and a through passageway extending from the top end to the bottom end of the sleeve member. The top end of the sleeve member includes an outwardly extending top flange and the bottom end of the sleeve member includes an outwardly extending bottom flange. The through passageway includes an upper portion and a lower portion. The inside diameter of the lower portion of the passageway is smaller than the inside diameter of the upper portion of the passageway.

As a result, the narrower lower portion of the passageway of the sleeve member accommodates the smaller lower section of the stud and the wider upper portion of the passageway of the sleeve member accommodates the wider upper section of the stud. After the lower end of the stud is attached to the lower hardware member, the sleeve is slipped over the stud. Then, the through hole of one hardware member is mounted over the plastic sleeve member between the top and bottom flanges of the plastic member.

In an embodiment, the through hole of the lower hardware member is mounted over the lower section of the stud and the connection between the bottom end of the lower section of the stud and the hardware member is made by pressing, spinning or swedging the bottom end of the lower section of the stud to create a rim, flange or an interference fit between the bottom end of the lower section of the stud and the through hole of the other hardware member.

In an embodiment, the lower section of the stud is threadably connected to the lower hardware member.

In an embodiment, the top end of the sleeve further comprises at least one slit extending through the top flange. The slit facilitates the compression of the top end of the sleeve as it is inserted through a through hole of an upper hardware member.

In an embodiment, the top end of the sleeve further comprises a plurality of slits that extend axially through the top flange of the sleeve member which enable the top end of the sleeve member to compress radially inward as the top end of the sleeve member is inserted through a through hole of the upper hardware member.

In an embodiment, the top flange is bevelled to facilitate the insertion of the top end of the sleeve through the through hole of the upper hardware member.

In an embodiment, a lower edge of the top flange is beveled or tapered to facilitate the removal of the upper hardware member from the sleeve member.

In an embodiment, a predetermined amount of clearance is provided between the upper hardware member and the top and bottom flanges of the sleeve to permit a limited amount of rocking or bowing of the upper hardware member without the upper hardware member being snapped off of the sleeve member.

In an embodiment, the sleeve member is fabricated from an acetyl homopolymer.

In an embodiment, the sleeve member is fabricated from polypropylene.

In an embodiment, the sleeve member is fabricated from a nylon material.

In an embodiment, the sleeve member is fabricated from a polymer sold under the DELRIN trademark.

In an embodiment, the stud is fabricated from brass.

In an embodiment, the stud further comprises a step disposed between the lower and upper sections of the stud and the sleeve member further comprises a ledge disposed between the upper and lower portions of the passageway. The stud is inserted into the sleeve member so that the step of the stud rests on or is otherwise engaged by the ledge of the sleeve member.

In an embodiment, the stud is inserted into the sleeve member so that a top surface of the stud is disposed vertically below the top flange of the sleeve member and further so that the top end of the sleeve member may be compressed radially inward after the stud is disposed within the sleeve member.

The present invention also provides an improved window hinge that includes a hinge track having a through hole and a hinge arm, also having a through hole. A snap stud assembly as described above is used to pivotally connect the hinge track to the hinge arm. The track may be mounted to a window frame or window sill or, alternatively, the track may be a fixed member mounted to the window sash. The hinge arm may be a pivoting member of any one of a variety of hinge arm designs.

More specifically, the snap stud assembly of the present invention includes a metallic stud having a lower generally cylindrical section connected to an upper generally cylindrical section. The upper section of the stud includes a top surface; the lower section of the stud includes a bottom surface. The outside diameter of the lower section is smaller than the outside diameter of the upper section and the stud further includes an outwardly extending step structure disposed between the upper and lower sections.

The snap stud assembly of the present invention also includes a tubular plastic sleeve member with a top end, a bottom end and a through passageway extending from the top end to the bottom end. The top end of the sleeve member includes an outwardly extending top flange and the bottom end of the sleeve member includes an outwardly extending bottom flange. The bottom flange of the sleeve member is intended to be disposed between the hinge arm and the hinge track, or the two hardware members which are being pivotally connected. The top flange of the sleeve member must be passed through the through hole of the hinge arm or one of the hardware members and therefore the top flange is preferably smaller than the bottom flange in terms of thickness and the extent to which the top flange extends radially outward.

The through passageway of the plastic sleeve member includes two distinct portions including an upper portion for accommodating the larger upper section of the stud and a lower portion for accommodating the smaller lower section of the stud. Preferably, the inside diameter of the upper portion of the through passageway is larger than the inside diameter of the lower portion of the through passageway. Further, in the preferred embodiment, a ledge structure is disposed within the through passageway between the upper and lower portion of the through passageway. The ledge structure of the sleeve member engages the step structure of the stud.

The bottom end of the stud is fixedly connected to the hinge track or other hardware member. Specifically, the bottom end of the lower section of the stud is extended through the through hole of the hinge track or hardware member. The bottom end is then pressed outward or otherwise deformed to provide a press fit between the bottom end of the lower section of the stud and the through hole of the hinge track or hardware member. Thus a fixed connection is provided between the stud and the hinge track or bottom hardware member and a pivotal connection is provided between the hinge arm or upper hardware member and the plastic sleeve.

After the sleeve has been mounted onto the stud as described above, the bottom of the lower section of the stud is attached to the lower hardware member trapping the sleeve between the upper section of the stud and the lower hardware member. Then, the top end of the sleeve member, and the top flange, are forcefully inserted through the through hole of the hinge arm or upper hardware member. To facilitate the insertion, one or more axial slits may be disposed in the top end of the sleeve member that extend through the top flange. The slits facilitate the ability of the top end of the sleeve member to be compressed during the insertion process. To further facilitate the insertion of the top end of the sleeve through the through hole of the upper hardware member, an upper surface of the top flange may be bevelled or curved. After the top end and top flange are inserted through the through hole of the hinge arm or hardware member, the hinge arm or hardware member is pivotally mounted to the outside of the sleeve member between the top and bottom flanges thereof.

To facilitate the lubrication of the pivotal connection between the hinge arm or hardware member and the plastic sleeve, the plastic sleeve is preferably fabricated from a polymer material such as an acetyl homopolymer, polypropylene or a nylon material. In a preferred embodiment, the plastic sleeve member is fabricated from a polymer sold under the DELRIN trademark. The plastic sleeve may also be fabricated from a glass filled nylon material.

The present invention also provides an improved method of pivotally connecting two hardware members together. The method of the present invention includes the first step of mounting the plastic sleeve over the stud so that the upper section of the stud is accommodated in the upper portion of the through passageway of the sleeve and the lower section of the stud is accommodated in the lower portion of the through passageway of the sleeve. Then, the bottom end of the lower section of the stud is attached to the lower hardware member thereby trapping the sleeve between the wider upper section of the stud and the lower hardware member. The bottom end of the lower section of the stud may be attached to the lower hardware by a variety of means. One convenient method is to use a spinning or deforming process on the lower end of the stud to create a rim or flange which provides an interference fit between the lower hardware member and the lower section of the stud. Of course, the lower section of the stud may also be threadably connected to the lower hardware member using other alternative fastening mechanisms.

After the stud, and consequently the sleeve, are attached to the lower hardware member, the upper hardware member is then forced over the top end of the sleeve. Specifically, the through hole of the upper hardware member is aligned with the top flange of the sleeve and pushed downward. Preferably, as noted above, the top flange of the sleeve includes bevels or a curved upper surface to facilitate the passage of the through hole of the upper hardware member over the top flange of the sleeve. Once the upper hardware member passes the top flange of the sleeve, it is trapped between the top and bottom flanges of the sleeve and is therefore pivotally connected to the lower hardware member.

Thus, the method of the present invention comprises three fast and easy steps. The sleeve is mounted to the stud, the lower end of the stud is attached to the lower hardware member, and then the upper hardware member is mounted over the top end of the sleeve.

It is therefore an advantage of the present invention to provide a snap stud assembly which may be simply snapped onto one hardware member and which may be quickly and easily connected to a second hardware member by deforming a lower end of the stud structure.

Another advantage of the present invention is that it provides an improved snap stud assembly with an improved lubricated pivotal connection between the assembly and one hardware member and a fixed connection between the assembly and a second hardware member that is fast and easy to make.

Another advantage of the present invention is that it provides an improved snap stud assembly that is faster to assemble than currently available snap stud assemblies.

Another advantage of the present invention is that it provides an improved snap stud assembly whereby the upper or pivoting hardware member may be easily removed from the snap stud assembly once installed.

Another advantage of the present invention is that it provides an improved snap stud assembly whereby the upper hardware is permitted to undergo a limited amount of rocking or bowing without being snapped off of or otherwise removed from the snap stud assembly.

Yet another advantage of the present invention is that it provides an improved snap stud assembly for providing a pivotal connection between two hardware members that does not require lubrication.

Other objects and advantages of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of an example of the invention.

In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION Of THE PRESENTLY PREFERRED EMBODIMENTS

Figure 1:
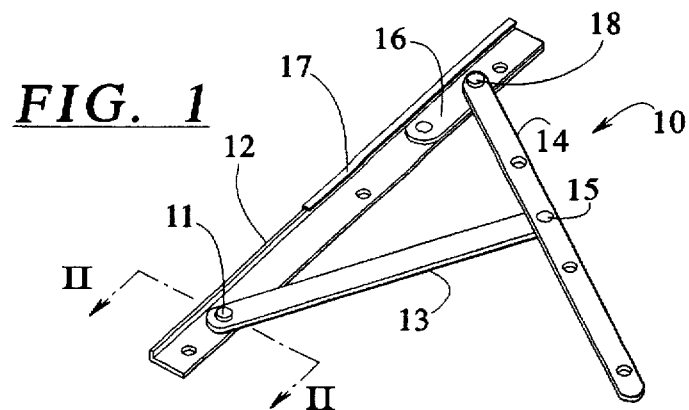
FIG. 1 is a top perspective view of a window hinge incorporating the snap stud assembly of the present invention.
Figure 2:
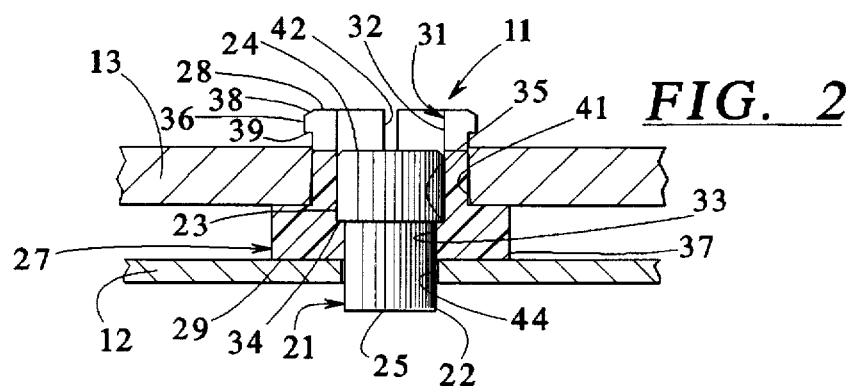
FIG. 2 is a sectional view taken along line 2—2 of FIG. 1.
Figure 3:
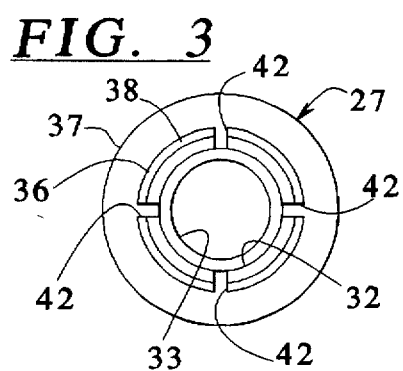
FIG. 3 is a top plan view of the tubular plastic insert shown in FIG. 2.
Figure 4:
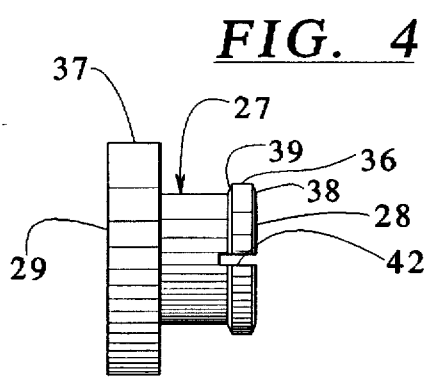
FIG. 4 is a side elevational view of the tubular plastic insert shown in FIG. 3.

A hinge arm assembly 10 is illustrated in FIG. 1, which is one of many examples of structures or hardware components which may incorporate the snap stud assembly 11 of the present invention as further illustrated in FIG. 2. Returning to FIG. 1, the hinge 10 includes a track member 12 which is pivotally connected to a hinge arm 13 and which is slidably and pivotally connected to a window arm 14. Specifically, the hinge arm 13 is pivotally connected to the track 12 at one end by way of a snap stud assembly shown at 11 and at its other end by way of a standard connection such as a rivet-type connection shown at 15. The window arm 14 is pivotally connected to a shoe 16 which is slidably accommodated on the track 12 by way of its entrapment underneath the ledge shown at 17. The pivotal connection between the hinge arm 14 and the shoe 16 is shown at 18.

In the embodiment shown in FIG. 1, only the connection between the hinge arm 13 and the track 12 incorporates the snap stud assembly 11 of the present invention. However, it is contemplated that other pivotal connections in the assembly 10 shown in FIG. 1 may incorporate a snap stud assembly 11 made in accordance with the present invention as well. Specifically, the connection shown at 15 between the hinge arm 13 and window arm 14 may also incorporate the snap stud assembly of the present invention. Further, if the window arm 14 is of a telescoping design, the connection between the window arm 14 and the window (not shown) will be a pivotal connection as opposed to a sliding-type connection and may incorporate the snap stud assembly as shown at 11 in FIG. 2. Further, it is anticipated that the snap stud assembly 11 of the present invention may be found useful when connecting any two rod-like hardware members with through holes disposed therein and, accordingly, the present invention is not limited to use in window hardware systems.

The snap stud assembly 11 is further illustrated in FIG. 2. The assembly 11 includes a stud 21 which, in turn, includes a lower section 22 which is connected to an upper section 23. The stud 21 is preferably fabricated from brass or another durable material such as a metal or hard plastic material. The lower section 22 has an outside diameter that is smaller than the upper section 23. In the preferred embodiment, both the lower section 22 and upper section 23 have a generally cylindrical configuration. The stud 21 further includes a top surface 24 and a bottom surface 25.

The assembly 11 further includes a tubular sleeve member shown at 27. The sleeve member 27 includes a top end 28 and a bottom end 29 with a through passageway 31 extending between the top end 28 and bottom end 29. The through passageway 31 includes an upper portion 32 and a lower portion 33. The upper portion 32 has an inside diameter slightly larger than the outside diameter of the upper section 23 of the stud 21 so that the upper section 23 of the stud 21 is mateably accommodated in the upper portion 32 of the through passageway 31. Similarly, the lower portion 33 of the through passageway 31 has an inside diameter only slightly larger than the outside diameter of the lower section 22 of the stud 21 so that the lower section 22 is mateably accommodated in the lower portion 33 of the through passageway 31.

In the embodiment illustrated in FIG. 2, the stud 21 further includes a step structure 34 disposed between the upper section 23 and lower section 22 of the stud 21. The sleeve member 27 also preferably includes a ledge structure 35 disposed between the upper portion 32 and lower portion 33. As shown in FIG. 2, the ledge structure 35 of the sleeve member 27 engages the step structure 34 of the stud 21.

The sleeve member 27 further includes a top flange 36 and a bottom flange 37. The bottom flange 37 is disposed between the hinge arm 13 and track member 12 (or other hardware members to be pivotally connected) and the top flange 36 is disposed above the hinge arm 13 so that the hinge arm 13 is trapped between the top flange 36 and bottom flange 37. To facilitate the insertion of the top end 28 of the sleeve member 27 through the through hole 41 of the arm structure 13, a plurality of slots 42 are provided in the top end 28 which extend through the top flange 36. The slots 42 facilitate the radial compression of the top end 28 and top flange 36 of the sleeve member 27 so that the top end 28 of the sleeve member 27 may be forced through the through opening 41 of the member 13. Because the sleeve member 27 is fabricated from a resilient plastic material, the top end 28 of the sleeve member 27 is compressible in the radially extending inward direction and, after inserted through the hole 41 in the member 13, the top end 28 and the top flange 36 will extend back outward to the position shown in FIG. 2.

To further facilitate the installation of the arm 13 over the sleeve member 27, the top flange 36 includes an upper bevel 38. The bevel 38, of course, may be replaced by a curved surface which otherwise facilitates the insertion of the through hole 41 over the top end 28 of the sleeve 27.

To facilitate the removal of the arm 13 from the sleeve 27, the top flange 36 further includes a lower bevel shown at 39. Again, the lower bevel 39 may be replaced by a curved or otherwise tapered surface to facilitate the passage of the top end 28 and top flange 36 of the sleeve member 27 through the through hole 41 of the arm 13 in the event the arm 13 needs to be removed or otherwise replaced.

To facilitate the installation and removal of the snap stud assembly 11 from the members 13 and 12, the top end 24 of the stud 21 should preferably be disposed below the top flange 36 of the sleeve member 27. With the top end 24 of the stud 21 disposed below the top flange 36, the upper section 23 of the stud does not interfere with the compression of the top end 28 of the sleeve member 27 so that the top end 28 may be radially compressed as the member 13 is pulled upward over the top flange 36.

Figure 5:
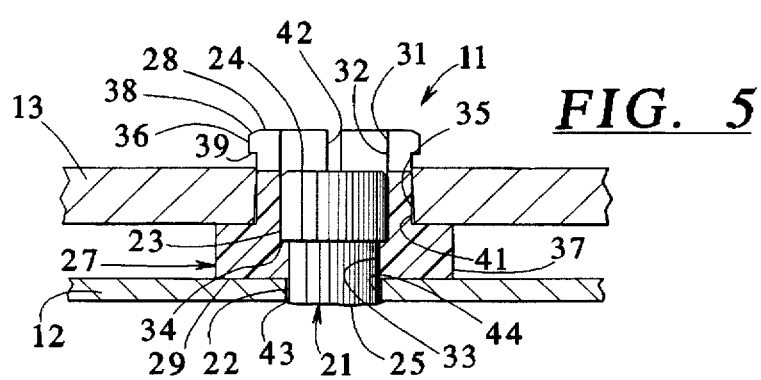
FIG. 5 is another sectional view taken along line 2—2 of FIG. 1 further illustrating the connection between the stud and the track.

The attachment between the bottom end 25 of the lower section 22 of the stud 21 to the member 12 is preferably made by deforming the bottom end 25 or pressing the bottom end 25 outward to form a rim or flange 43 as shown in FIG. 5. In addition, any procedure can be employed which provides a snug interference fit between the bottom end 25 of the lower section 22 of the stud 21 and the through hole 44 of the member 12. One such alternative connection would be a threaded connection between the bottom end 25 and the through hole 44.

The sleeve member 27 is preferably fabricated from a polymer material such as an acetyl homopolymer, a polypropylene material or a nylon material. The sleeve member 27 may also be fabricated from a glass filled nylon material. One particularly preferred material is an acetyl resin sold under the DELRIN trademark by DuPont Engineering Polymers of Wilmington, Del. A polymer material is preferred for the sleeve member 27 because the sleeve member 27 serves as a lubricating bushing within the through hole 41 of the member 13 and the bottom flange 37 of the sleeve member 27 serves as a lubricating washer between the hardware members 13 and 12.

Thus, the present invention provides a snap stud assembly 11 that provides a simplified connection mechanism between the upper hardware member 13 and the stud assembly 11 by way of the tubular plastic sleeve 27 with a resiliently compressible top end 28 may be forced through a smaller through hole 41 disposed in the upper member 13. The snap stud assembly 11 is also easily attached to the lower member 12 by deforming the bottom end 25 of the stud 21 to provide an interference fit between the stud 21 and the lower member 12. The assembly 11 as illustrated in the figures is attached to the members 12, 13 in a fast and efficient manner and can be assembled by using automated equipment. Specifically, the bottom end 25 of the stud 21 is attached to the through hole 44 of the member 12. Then, the sleeve 27 is slipped over the top end 24 of the stud 21. After the sleeve 27 is in place, the through hole 41 of the member 13 is forced over the top end 28 of the sleeve 27. Further, because of the resilient compressibility of the top end 28 of the sleeve member 27, the upper member 13 can be removed from the snap stud assembly 11 once installed.

It should be understood that various changes and modifications to the presently preferred embodiments as described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A snap stud assembly pivotally connecting two hardware members together, the snap stud assembly comprising:

a stud comprising a lower section connected to an upper section, the lower section being narrower than the upper section, a tubular sleeve member comprising a top end and a bottom end with a through passageway extending from the top end to the bottom end, the top end comprising an outwardly extending top flange, the bottom end comprising an outwardly extending bottom flange, the through passageway comprising an upper portion and a lower portion, the upper portion for accommodating the upper section of the stud and the lower portion for accommodating the lower section of the stud.

2. The snap stud assembly of claim 1 wherein the top end of the sleeve member further comprises at least one slit extending through the top flange.

3. The snap stud assembly of claim 1 wherein the top end of the sleeve member further comprises a plurality of axial slits extending through the top flange.

4. The snap stud assembly of claim 1 wherein the stud is fabricated from brass.

5. The snap stud assembly of claim 1 wherein the sleeve member is fabricated from a material selected from the group consisting of acetyl homopolymer, polypropylene and nylon.

6. The snap stud assembly of claim 1 wherein the stud further comprises a step disposed between the lower and upper sections and the sleeve member further comprises a ledge disposed between the upper and lower portions of the passageway, the step of the stud engaging the ledge of the sleeve member.

7. The snap stud assembly of claim 1 wherein the through hole of one of said hardware members is disposed around an outside surface of the sleeve and between the top and bottom flanges of the sleeve.

8. The snap stud assembly of claim 1 wherein the upper section of the stud further comprises a top surface, said top surface being disposed below the top flange of the sleeve member.

9. The snap stud assembly of claim 1 wherein the top flange of the sleeve member further comprises an upper beveled surface.

10. The snap stud assembly of claim 9 wherein the top flange of the sleeve member further comprises a lower beveled surface.

11. The snap stud assembly of claim 1 wherein the top end of the sleeve member is resiliently compressible in a radially inward direction.

12. A window hinge comprising:
a hinge track comprising a through hole and a hinge arm comprising a through hole, the hinge track being pivotally attached to the hinge arm by a snap stud,
the snap stud comprising a lower section connected to an upper section, the lower section having a bottom surface, the lower section having a first outside diameter, the upper section having a second outside diameter, the first outside diameter being smaller than the second outside diameter,
a tubular sleeve member comprising a top end and a bottom end with a through passageway extending from the top end to the bottom end, the top end comprising an outwardly extending top flange, the bottom end comprising an outwardly extending bottom flange, the passageway comprising an upper portion having an upper inside diameter for accommodating the upper section of the stud, the passageway further comprising a lower portion having a lower inside diameter for accommodating the lower section of the stud,
the through hole of the hinge arm being disposed around an outside surface of the sleeve and between the top and bottom flanges of the sleeve,
the bottom surface of the lower section of the stud being attached to the hinge track.

13. The window hinge of claim 12 wherein the top end of the sleeve member further comprises at least one slit extending through the top flange.

14. The window hinge of claim 12 wherein the top flange of the sleeve member further comprises a beveled upper surface.

15. A snap stud assembly pivotally connecting two hardware members together, each of said hardware members having through holes, the snap stud assembly comprising:

a metallic stud a metallic stud comprising a lower generally cylindrical section to an upper generally cylindrical section, the lower section having a first outside diameter, the upper section having a second outside diameter, the first outside diameter being smaller than the second outside diameter, the stud further comprises a step disposed between the lower and upper cylindrical sections, the upper section further comprising a top surface, a tubular plastic sleeve member comprising a top end and a bottom end with a through passageway extending from the top end to the bottom end, the top end comprising an outwardly extending top flange with a plurality of slits extending through the top flange, the bottom end comprising an outwardly extending bottom flange, the top flange comprising a beveled upper surface, the passageway comprising an upper portion having an upper inside diameter for mateably accommodating the upper section of the stud, the passageway further comprising a lower portion having a lower inside diameter for mateably accommodating the lower section of the stud, the sleeve member further comprising a ledge disposed between the upper and lower portions of the passageway, the top surface of the upper section of the stud being disposed below the top flange of the sleeve member, the step of the stud engaging the ledge of the sleeve.

16. The snap stud assembly of claim 15 wherein the through hole of one of said hardware members is disposed around an outside surface of the sleeve and between the top and bottom flanges of the sleeve.

17. The snap stud assembly of claim 15 wherein the lower section of the stud is disposed in the through hole of one of said hardware members.

18. A snap stud assembly for pivotally connecting two hardware members together, the snap stud assembly comprising:
a stud comprising a narrower lower section connected to a wider upper section, the upper section further comprising a top surface,
a tubular sleeve member comprising a top end and a bottom end with a through passageway extending from the top end to the bottom end, the top end comprising an outwardly extending top flange, the bottom end comprising an outwardly extending bottom flange, the passageway comprising an upper portion for accommodating the upper section of the stud so that the top surface of the upper section of the stud is disposed below the top flange of the sleeve member, the passageway further comprising a lower portion for accommodating the lower section of the stud,
the top flange of the sleeve member being resiliently compressible in a radially inward direction.

19. A method of pivotally connecting upper and lower hardware members together, at least the hardware member having a through hole, the method comprising the following steps:
providing a stud comprising a lower section connected to an upper section, the lower section being narrower than the upper section, the upper section further comprising a top surface, the lower section further comprising a bottom surface,
providing a sleeve member comprising a tubular member having a top end and a bottom end with a through passageway extending from the top end to the bottom end, the top end comprising an outwardly extending top flange, the bottom end comprising an outwardly extending bottom flange, the passageway comprising an upper portion and a lower portion, the top end of the sleeve member being resiliently compressible, placing the sleeve over the stud so that the lower section of the stud is accommodated in the lower portion of the passageway and the upper section of the stud is accommodated in the upper section of the passageway with the top surface of the upper section disposed below the top flange of the sleeve.

attaching the bottom surface of the lower section to the lower hardware member, forcing the through hole of the upper hardware member over the top end of the sleeve.

20. The method of claim 19 wherein the top end of the sleeve member further comprises at least one slit extending through the top flange.

21. The method of claim 19 wherein the top flange of the sleeve member further comprises an upper beveled surface.

* * * * *